C. L. BEST.
AUTOTRACTOR.
APPLICATION FILED JUNE 4, 1912.

1,158,114.

Patented Oct. 26, 1915.
2 SHEETS—SHEET 1.

C. L. BEST.
AUTOTRACTOR.
APPLICATION FILED JUNE 4, 1912.
1,158,114.
Patented Oct. 26, 1915.
2 SHEETS—SHEET 2.
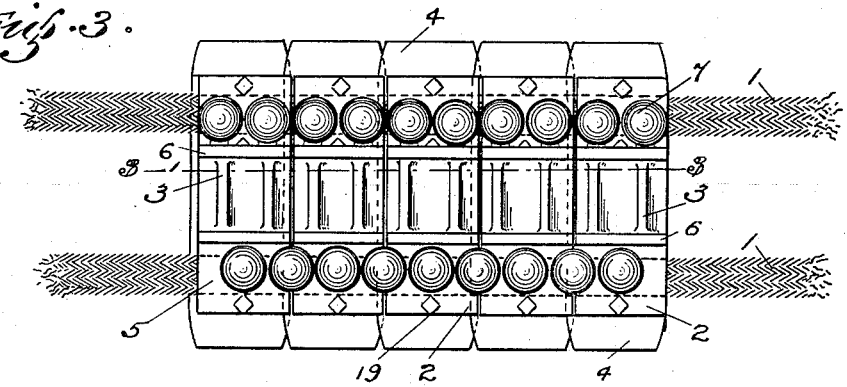
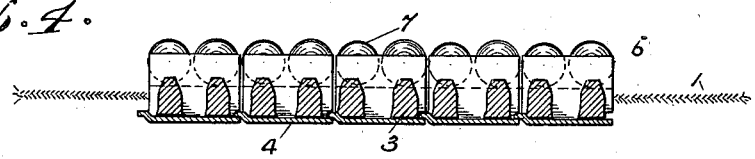
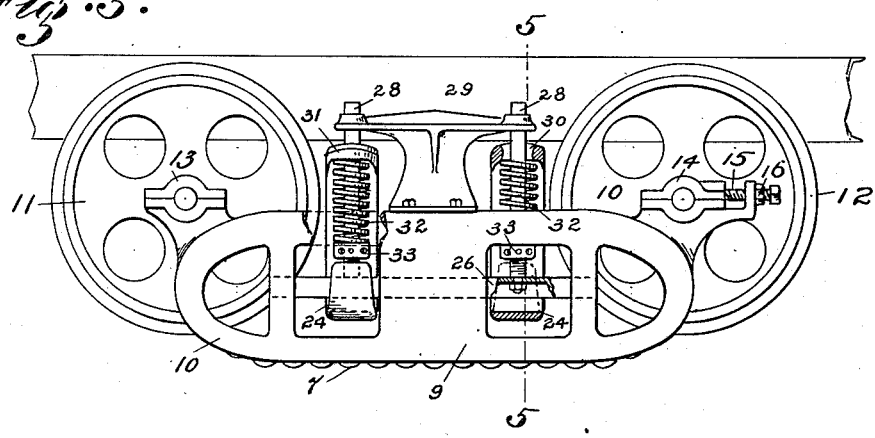
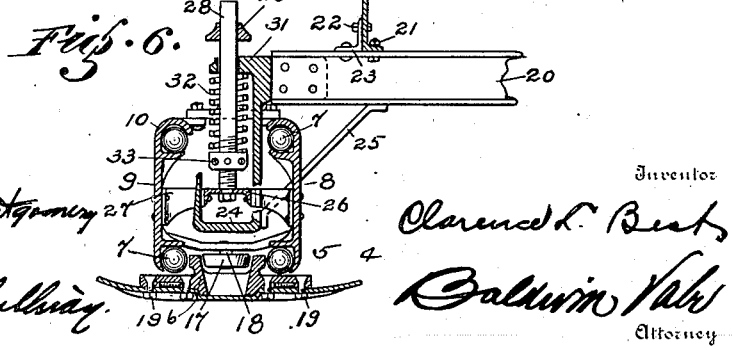

UNITED STATES PATENT OFFICE.

CLARENCE L. BEST, OF SAN LEANDRO, CALIFORNIA.

AUTOTRACTOR.

1,158,114.   Specification of Letters Patent.   Patented Oct. 26, 1915.

Application filed June 4, 1912. Serial No. 701,664.

*To all whom it may concern:*

Be it known that I, CLARENCE L. BEST, a citizen of the United States, and a resident of the city of San Leandro, county of Alameda, and State of California, have invented new and useful Improvements in Autotractors, of which the following is a specification.

This invention relates to improvements in autotractors, and more particularly to the traction mechanism thereof.

The objects sought to be accomplished are to provide a flexible traction belt comprising a series of traction sections flexibly joined together and adapted to encircle the traction truck; to resiliently attach the supporting trucks to the main frame of the tractor; and to increase the points of rolling contact between the supporting trucks and the traction belts.

Broadly the invention consists of two parallel endless strips of textile composed of interwoven or braided strands, having transverse traction sections fixed thereon. Sprocket teeth formed in the traction sections and wearing shoes fixed to the outer portion of these sections. The endless traction belt is adapted to encircle a supporting truck, having pulleys mounted in each end, around which the traction belt is adapted to travel. The sides of the supporting truck are provided with elliptical ball races between the lower portion of which and the traction belt balls are interposed, that are adapted to roll, returning through the upper section of the ball races in continuous procession.

The trucks are swung in guides on the main frame of the tractor; interposed buffer springs allow a limited oscillation of the trucks. The traction belts engage driving pinions fixed upon a differential countershaft, mounted upon the main frame and geared to the prime mover.

Figure 1:
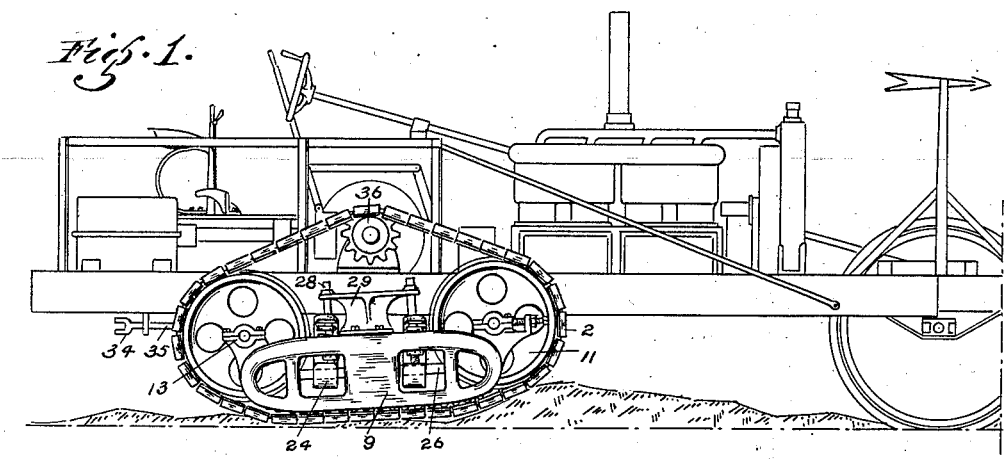
Figure 2:
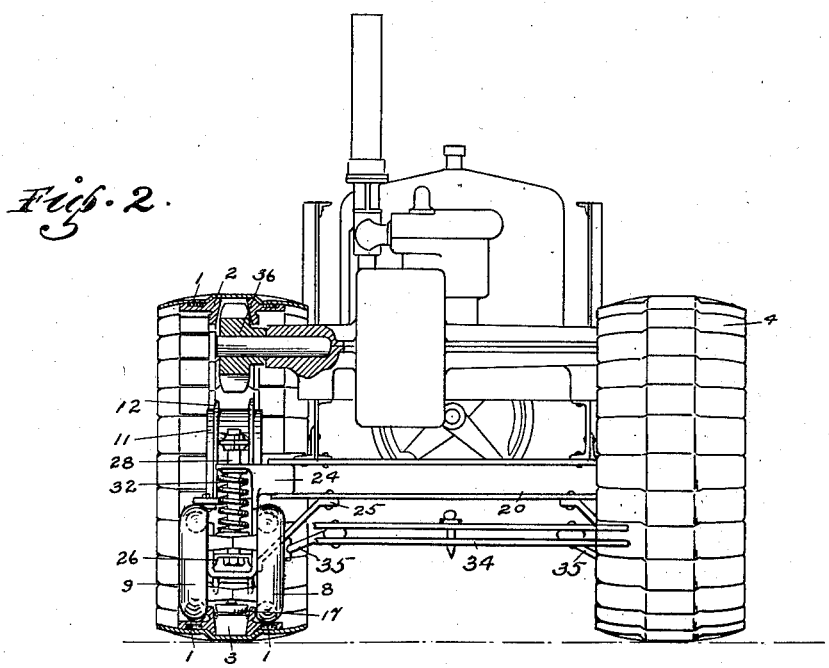

In the drawings: Figure 1 is a side elevation illustrating a tractor having traction mechanisms constructed in accordance with this invention applied thereto. Fig. 2 is a rear elevation of the same, one of the traction mechanisms is shown partially in cross section to disclose the internal relation of the parts. Fig. 3 is a fragmentary detail plan view of the ground portion of the traction belt viewed from the inside. Fig. 4 is a longitudinal cross section taken on line 3—3, Fig. 3. Fig. 5 is a side elevation detail of the supporting truck partially in cross section, illustrating the manner of attaching the trucks to the main frame of the tractor. Fig. 6 is a rear elevation of the same in cross-section, taken on the line 5—5, Fig. 5, including the traction belt.

In detail the construction consists of the traction belt comprising the endless flat cables or strips 1 composed of braided strands of high tensile strength to prevent stretching. These strips are arranged parallel with sprocket space between. The traction sections 2 having the sprocket teeth 3 formed therein, preferably two teeth to the section, are clamped across the endless strips *seriatim*. The edges of the traction sections abut to properly maintain the pitch of the sprocket teeth. The outer portion of the traction belt, *i. e.*, that portion nearest the ground in operating, is provided with the wearing shoes 4. These are composed of an integral piece of plate metal, having grousers upset from the body thereof, adapted to take the wear of road contact and prevent slipping. One edge of each wearing shoe is set up and adapted to overlap the edge of the contiguous shoe. The inner sides of the traction sections are provided with the roller plane surface 5 and the upstanding flanges 6, in the angle of which the balls 7 are adapted to roll.

The truck sides 8 and 9 are preferably composed of integral steel castings having the ball race orbit 10 formed therein. The cross section of the ball race is sufficiently restricted to inclose and retain the balls in their travel. The lower section of the ball race contiguous to the ground portion of the traction belt may be an open angle, permitting the ball to impinge on the flanges 6 to absorb the side thrust of the belt. These truck sides are right and left to form pairs, between the ends of which the idlers 11 are mounted in the boxes 13 and 14, one set of which is provided with the threaded stems 15 having the running nut 16, engaging the brackets on the truck sides, whereby the slack in the traction belt may be taken up.

The idlers 11 have the circumferential flanges 12 to guide the projecting flanges 6 on the traction sections. The horizontal rollers 17 journaled on the pins 18 fixed in the supporting truck are set just above the top of the teeth 3 and are adapted to impinge on the sides of the flanges 6, to counteract any tendency toward disalinement between the ground portion of the traction belt and the traction truck.

The orbit of travel of the traction belt is elliptical. The ends engage the idlers, the ground portions support the traction weight through the trucks and the interposed balls. The upper side portion is supported upon the driving pinion 36 which engages the teeth 3.

When continual usage has developed a certain amount of stretch in the strips 1, sufficient to interfere with the pitch of the sprocket teeth, the sprocket 36 can be replaced by one having a "mongrel" pitch to correct this inaccuracy. If the stretch is excessive the traction sections can be unclamped and readjusted on the strips 1 restoring the original pitch relation. The strips 1 are clamped between the traction sections and the wearing shoes by the bolts 19.

The supporting trucks are provided with two cross connecting I beams 20 that are secured to the main frame by the bolts 21 and 22, and the angle 23 riveted to the beams. The stirrup guides 24 are rigidly fixed upon the outer ends of these crossbeams and reinforced by the braces 25. Each truck is provided with a longitudinal beam 26 rigidly held therein by the brackets 27 extending inward from the truck sides and attached to this beam. This beam is located within and is guided in its vertical movement by the loop of the stirrup 24. The upright rods 28 are fixed in the beam, and extend upward and are secured in the brackets 29 mounted on the truck. These rods are guided in elongated openings 30, provided in the brackets 31, extending from the stirrups 24, permitting a limited oscillation of the traction truck. The buffer springs 32 are interposed between the brackets 31 and the running nuts 33 threaded on the rods 28. The weight of the tractor resting upon the supporting trucks is supported entirely upon these buffer springs, the function of which is obvious.

Particular attention is directed to the fact that, while the traction trucks are free to oscillate within the defined limits of the buffer springs, and the stirrup guides, there is no fixed pivotal center. By thus resiliently mounting the supporting trucks on the main frame, the flexibility of the traction belts relieves the driving mechanism of the stresses of road condition; and eliminates the necessity of preserving any exact alinement between the traction mechanism and the driving elements of the prime mover. A further advantage of this flexibility is the fact that except in extraordinary circumstances, inequalities in the road plane cannot lift the pilot wheel and destroy its steering qualities.

The draw-bar 34 is preferably attached directly to the traction trucks, through the links 35. This system of attaching the drawbar is preferred because it transmits the tractive load directly to the traction mechanism, relieving the main structure of all unnecessary strains; however, the draft bar can readily be attached to the main frame should occasion require it.

As illustrated and described the flexible traction mechanisms can be displaced by removing the bolts 21 and 22 detaching the beams 20; and an axle and concentric wheels substituted, the driving pinion on the countershaft engaging internal gears in the wheels.

On a hard surface the wheel drive has certain advantages over the traction belt construction for freighting and general roadwork. On soft yielding surfaces where great tractive area is demanded, without packing the ground, for instance, in agricultural work, the traction belt is vastly superior to the wheel. The advantages of substitution of one of these traction systems for the other on the same tractor is sufficiently apparent.

The use of balls or free rollers in this art accomplishes many substantial improvements over the fixed roller journaled in the supporting truck. The use of balls increases the points of rolling contact between the truck and the traction belt, lowers the center of gravity at this point, avoids buckling up of the belt between points of contact, eliminates fixed journals with their attendant wear and necessity of constant lubrication, and the disposition of rollers with flanges to climb off the belt or leave the path of travel because of lateral deflection.

Having thus described this invention, what is claimed and desired to be secured by Letters Patent is:

1. A traction mechanism comprising a truck composed of spaced apart rigidly connected side frames each having a ball race therein, a flexible belt encircling said truck, balls in said races upon which said belt bears, and rollers supported by said side frames and mounted between the latter, said rollers engaging the belt to prevent the lateral displacement of the latter.

2. A traction mechanism comprising a truck having a supporting frame, brackets attached thereto, guide rods mounted to reciprocate in said brackets, a longitudinal beam attached to the lower ends of said guide rods, stirrups attached to said frame and passed transversely around said beam to guide the same, springs for cushioning the upward movement of said beam, and a traction belt encircling said truck.

3. A traction mechanism comprising a truck with a longitudinal beam; stirrup guides fixed on the tractor frame and engaging said beam; guide rods fixed on said truck and engaging said stirrup guides; buffer springs interposed between the stirrup guides and said longitudinal beam; a traction belt encircling said truck.

4. A traction mechanism comprising a truck composed of spaced apart rigidly connected side frames each having a ball race therein, a flexible belt encircling said truck and provided with spaced apart longitudinal flanges, balls in said races and upon which said belt bears, and rollers supported by said side frames and engaging the longitudinal flanges of the belt.

5. A traction mechanism comprising a traction belt, having teeth thereon, and encircling a truck; flanged end rollers in said truck engaging said belt; free rollers interposed between said belt and the truck, stirrup guides engaging said truck; buffer springs interposed between said guides and the truck; and a driving pinion adapted to engage said traction belt.

6. In a tractor a traction mechanism comprising trucks; cross beams extending between said trucks and bolted to the tractor frame; stirrup guides fixed upon said beams; guide rods fixed in said trucks and slidably engaging said guides; buffer springs interposed between said trucks and said guides; traction belts encircling said trucks; and free rollers interposed between said belts and the trucks.

7. A traction mechanism comprising a truck; a traction belt encircling said truck; rollers interposed between said belt and said truck; angular flanges extending from said belt; a horizontal roller mounted upon a vertical axis fixed on said truck, and adapted to impinge on said flanges.

CLARENCE L. BEST.

Witnesses:
BALDWIN VALE,
JAS. M. MONTGOMERY.